(12) United States Patent
Miyake

(10) Patent No.: US 11,269,270 B2
(45) Date of Patent: Mar. 8, 2022

(54) IMAGING SYSTEM INCLUDING A STEERING ROLLER TILTABLE ABOUT A FULCRUM

(71) Applicant: HEWLETT-PACKARD DEVELOPMENT COMPANY, L.P., Spring, TX (US)

(72) Inventor: Koji Miyake, Yokohama (JP)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/051,751

(22) PCT Filed: Jun. 10, 2019

(86) PCT No.: PCT/US2019/036237
§ 371 (c)(1),
(2) Date: Oct. 29, 2020

(87) PCT Pub. No.: WO2020/018195
PCT Pub. Date: Jan. 23, 2020

(65) Prior Publication Data
US 2021/0263449 A1 Aug. 26, 2021

(30) Foreign Application Priority Data
Jul. 20, 2018 (JP) .............................. JP2018-136618

(51) Int. Cl.
*G03G 15/16* (2006.01)
*B65G 39/16* (2006.01)
*B65H 5/02* (2006.01)

(52) U.S. Cl.
CPC ......... *G03G 15/1615* (2013.01); *B65G 39/16* (2013.01); *B65H 5/021* (2013.01); *B65H 2403/533* (2013.01); *B65H 2404/256* (2013.01)

(58) Field of Classification Search
USPC ........................................................ 399/165
See application file for complete search history.

(56) References Cited

U.S. PATENT DOCUMENTS

| 9,067,737 B2 | 6/2015 | Hazeki |
| 2009/0162098 A1 | 6/2009 | Shirakata |

(Continued)

FOREIGN PATENT DOCUMENTS

| EP | 2073066 A1 | 6/2009 |
| EP | 2535775 A3 | 5/2017 |

(Continued)

OTHER PUBLICATIONS

Translation of cited document JP10-152242A (Year: 1998).*

*Primary Examiner* — Quana Grainger
(74) *Attorney, Agent, or Firm* — Staas & Halsey LLP

(57) ABSTRACT

An imaging system includes a steering roller and a positioning mechanism. The steering roller extends along a longitudinal direction, and being tiltable about a fulcrum to adjust an alignment position of an endless belt. The positioning mechanism is coupled to the steering roller, to position an adjustable position of the fulcrum of the steering roller, along the longitudinal direction of the steering roller. The positioning mechanism includes a guide that extends along the longitudinal direction of the steering roller, and a protrusion that engages with the guide, and that is located at the adjustable position of the fulcrum.

12 Claims, 16 Drawing Sheets

(56) References Cited

U.S. PATENT DOCUMENTS

| | | | |
|---|---|---|---|
| 2011/0070001 A1 | 3/2011 | Morofushi | |
| 2012/0082473 A1* | 4/2012 | Hara | G03G 15/1615 |
| | | | 399/66 |
| 2015/0227089 A1 | 8/2015 | Hozumi et al. | |
| 2018/0284682 A1* | 10/2018 | Tsukijima | G03G 15/1615 |

FOREIGN PATENT DOCUMENTS

| | | |
|---|---|---|
| JP | 4-272042 | 9/1992 |
| JP | 10152242 | 6/1998 |
| JP | 2001139120 | 5/2001 |
| JP | 200291185 | 3/2002 |
| JP | 2010145529 | 7/2010 |
| JP | 201388788 | 5/2013 |

\* cited by examiner

*Fig.5*
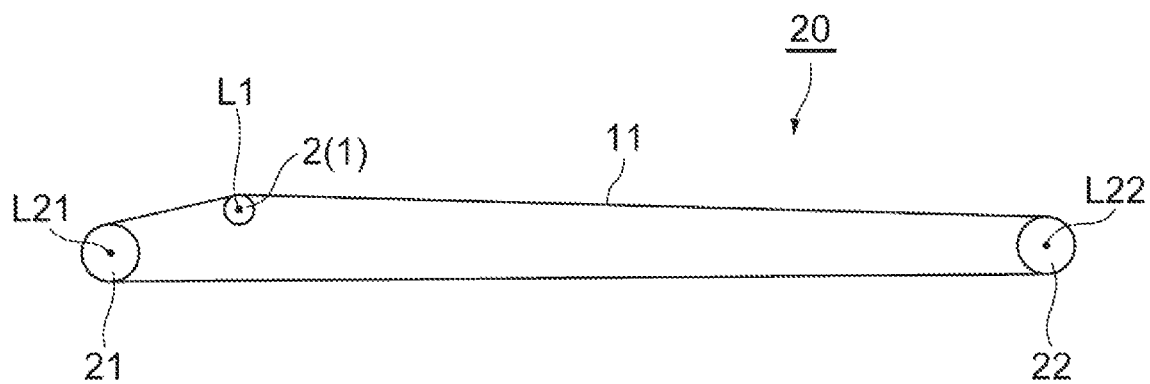
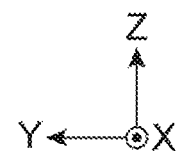

Fig.10
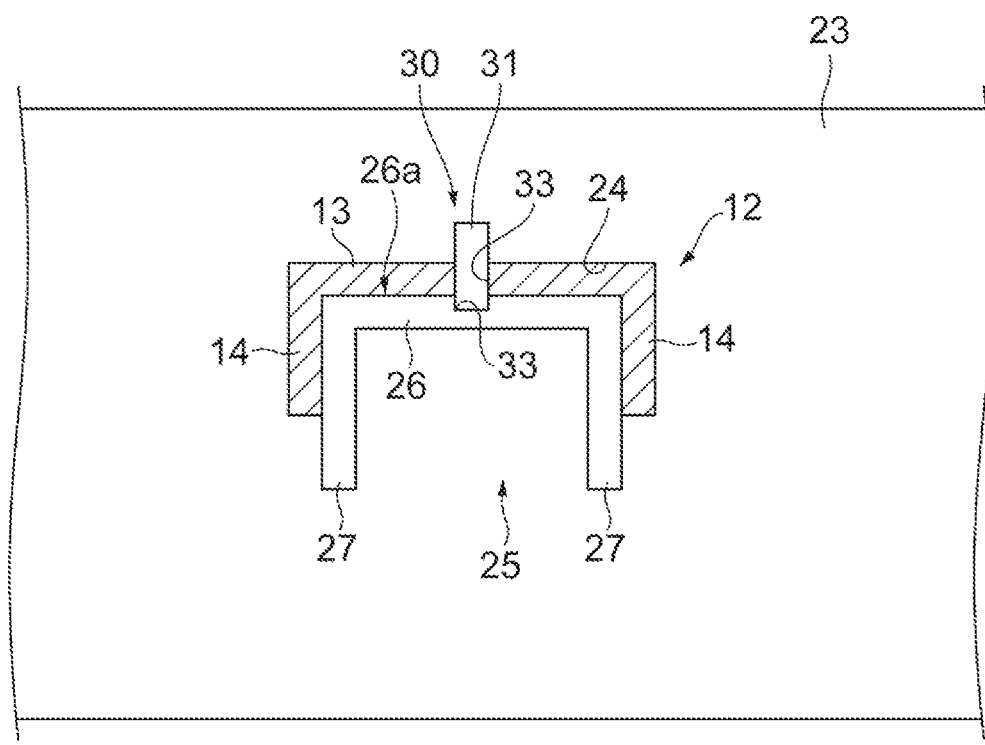
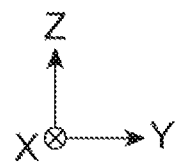

IMAGING SYSTEM INCLUDING A STEERING ROLLER TILTABLE ABOUT A FULCRUM

CROSS REFERENCE TO RELATED APPLICATIONS

This application is a U.S. National Stage Application which claims the benefit under 35 U.S.C. § 371 of International Patent Application No. PCT/US2019/036237 filed on Jun. 10, 2019, which claims priority from Japanese Application No. 2018-136618 filed on Jul. 20, 2018, the contents of which are incorporated herein by reference.

BACKGROUND

An imaging system includes a belt driving device. The belt driving device includes a first belt roller and a second belt roller around which an endless belt is wound.

BRIEF DESCRIPTION OF DRAWINGS

FIG. 5 is a side view illustrating components of an example belt driving device.

FIG. 10 is a cross-sectional view showing components of an example positioning mechanism, including an example side member.

DETAILED DESCRIPTION

In the following description, with reference to the accompanying drawings, the same reference numbers are assigned to the same components, or to similar components having the same function, and overlapping description is omitted. In some examples, an imaging system may include an image forming apparatus such as a printer. In some examples, an imaging system may include a portion of the image forming apparatus. In some examples, the imaging system may include a belt abnormality detection device. In some examples, the imaging system may include a belt driving device. In some examples, the imaging system may include a belt adjustment mechanism. The imaging system may include a transfer belt system.

Figure 1:
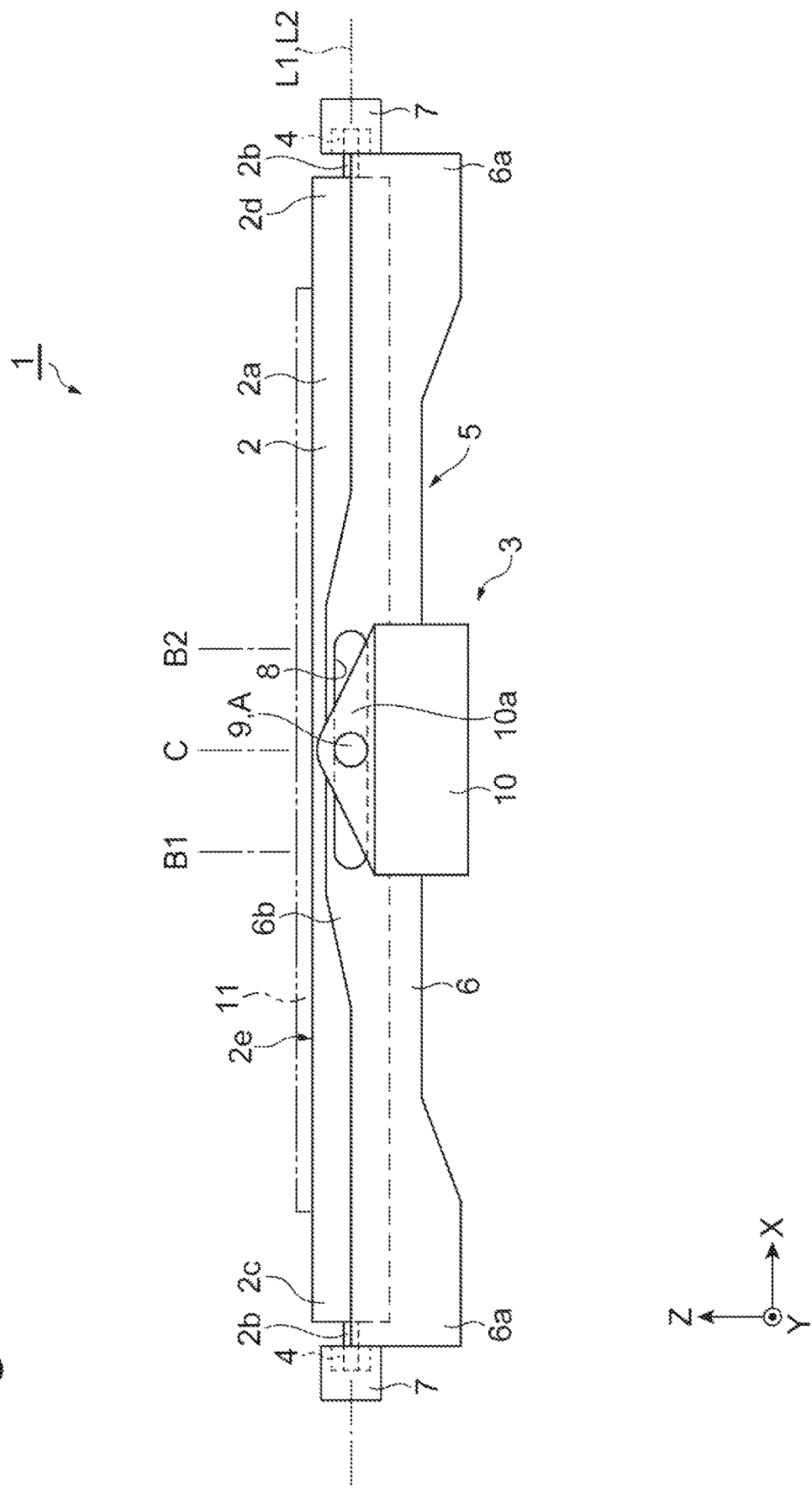
FIG. 1 is a front view of an example belt adjustment mechanism.

With reference to FIG. 1, an example belt adjustment mechanism 1 includes a steering roller 2 that can rotate around a fulcrum A to be inclined, and a positioning mechanism 3 that can change (or adjust) a position of the fulcrum A in a direction along a longitudinal direction L2 of the steering roller 2.

In FIG. 1, an X direction corresponds substantially to a direction along the longitudinal direction L2 of the steering roller 2, a Z direction corresponds substantially to an upper and lower direction (or an up-down direction), and a Y direction corresponds to a direction that intersects the X direction and the Z direction. For example, the Y direction may intersect, substantially perpendicularly, an X-Z plane formed along the X direction and the Z direction.

The steering roller 2 includes a roller main body 2a and a pair of small-diameter portions 2b. In the longitudinal direction L2 of the steering roller 2, the small-diameter portions 2b extend from the roller main body 2a to an external side, for example protruding out from the roller main body 2a. For example, the roller main body 2a and the small-diameter portions 2b may have a columnar shape (or cylindrical shape). An outer diameter of each of the small-diameter portion 2b is smaller than an outer diameter of the roller main body 2a. The roller main body 2a and the small-diameter portion 2b are coaxially formed.

The steering roller 2 is supported by a pair of bearings 4 to be rotatable around an axial line L1 The axial line L1 is a virtual straight line that extends along the longitudinal direction L2 of the steering roller 2. The bearings 4 rotatably support both ends of the steering roller 2 in the longitudinal direction L2. For example, the bearings 4 may include cylindrical sleeves. The bearings 4 may be other bearings. Each of the bearings 4 includes a plane that can contact or engage with an outer peripheral surface of the small-diameter portion 2b.

The example belt adjustment mechanism 1 can include a steering roller holding member 5 that holds the steering roller 2. The steering roller holding member 5 includes a steering roller holding member main body 6 and a pair of bearing holding members 7. The steering roller holding member 5 can include a bearing supporting member. The steering roller holding member main body 6 extends along the longitudinal direction L2 of the steering roller 2. For example, each of the bearing holding members 7 may include a cylindrical bearing accommodation portion, in order to hold or support the respective bearings 4. The bearing holding members 7 are attached to the respective ends 6a of the steering roller holding member main body 6. The end 6a is an end in the longitudinal direction L2 of the steering roller 2.

The steering roller holding member main body 6 may include a pair of side plates 6b which are disposed to face each other in the Y direction. For example; a plate thickness direction (e.g. a direction across a thickness) of the side plates 6b is a direction along the Y direction. The pair of side plates 6b is disposed on an outer side of the steering roller 2 in the Y direction. For example; the steering roller 2 may be disposed substantially between the pair of side plates 6b, in the Y direction. An elongated hole 8 is provided in the side plates 6b to pass through the side plates 6b in a plate thickness direction. The elongated hole 8 is continuous (e.g. extends or is elongated) in the longitudinal direction L2 of the steering roller 2.

The positioning mechanism 3 includes the elongated hole 8, a pivot shaft (a columnar member, a protrusion) 9, and a pivot shaft holding member 10. For example, the pivot shaft 9 has a columnar shape, and provides the fulcrum A of the steering roller 2, The pivot shaft 9 extends in the Y direction from the pivot shaft holding member 10. The pivot shaft holding member 10 may include a pair of side portions 10a which are disposed to face each other in the Y direction. The pair of side portions 10a is disposed on an outer side of the steering roller holding member main body 6 in the Y direction. In other words, the steering roller holding member main body 6 is disposed between the pair of side portions 10a. The side portions 10a are disposed to face the side plates 6b in the Y direction.

The pivot shaft 9 is attached to the side portions 10a, The pivot shaft 9 protrudes toward the side plates 6b. The pivot shaft 9 can include a protrusion that protrudes toward the steering roller 2, and may pass through the elongated hole 8 of the side plates 6b in the plate thickness direction. The elongated hole 8 is a guide that extends in the longitudinal direction L2 of the steering roller 2. The elongated hole 8 may be a concave portion (or recessed portion) that accommodates the pivot shaft 9. An outer peripheral surface of the pivot shaft 9 is in contact with an inner peripheral surface of the elongated hole 8. The pivot shaft 9 can move relative to the elongated hole 8, inside the elongated hole 8, in the longitudinal direction L2 of the steering roller 2.

Figure 2:
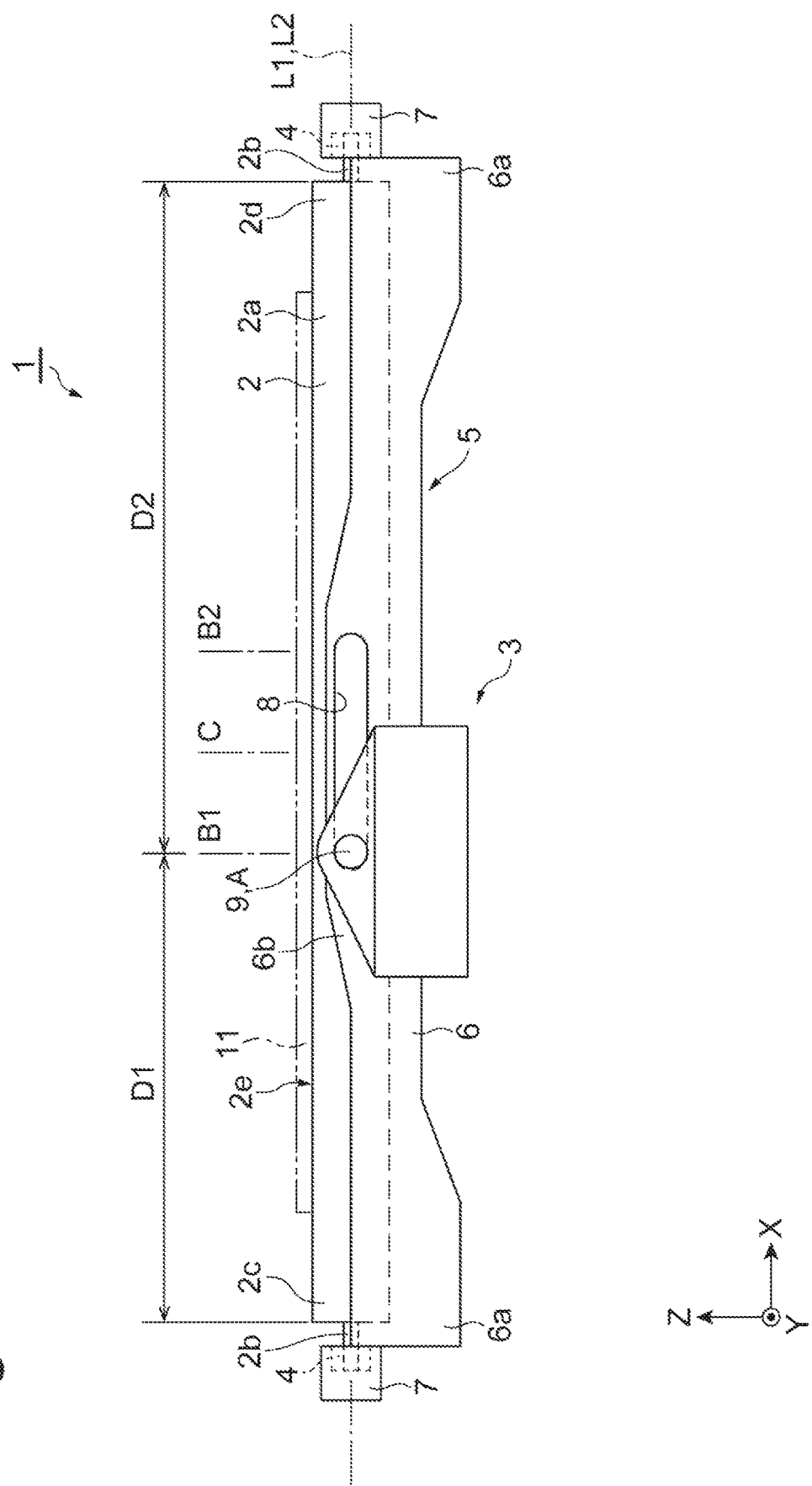
FIG. 2 is a front view of an example belt adjustment mechanism.

The positioning mechanism 3 can move in the longitudinal direction L2 of the steering roller 2. In FIG. 1 the pivot shaft 9 is located substantially in alignment with the center C of the steering roller 2 in the longitudinal direction L2 thereof. In FIG. 2, the pivot shaft 9 is shown, deviated from the center C, to align with a position on a first end 2c side in the longitudinal direction L2 of the steering roller 2, at a first position B1. The pivot shaft 9 can move to a position on a second end 2d side in the longitudinal direction L2 of the steering roller 2, for example at a second position B2. The pivot shaft 9 can move to positions other than the center C, the first position B1, and the second position B2, for example pivot shaft 9 can move toward intermediate positions between B1 and B2, depending on an example state.

Figure 3:
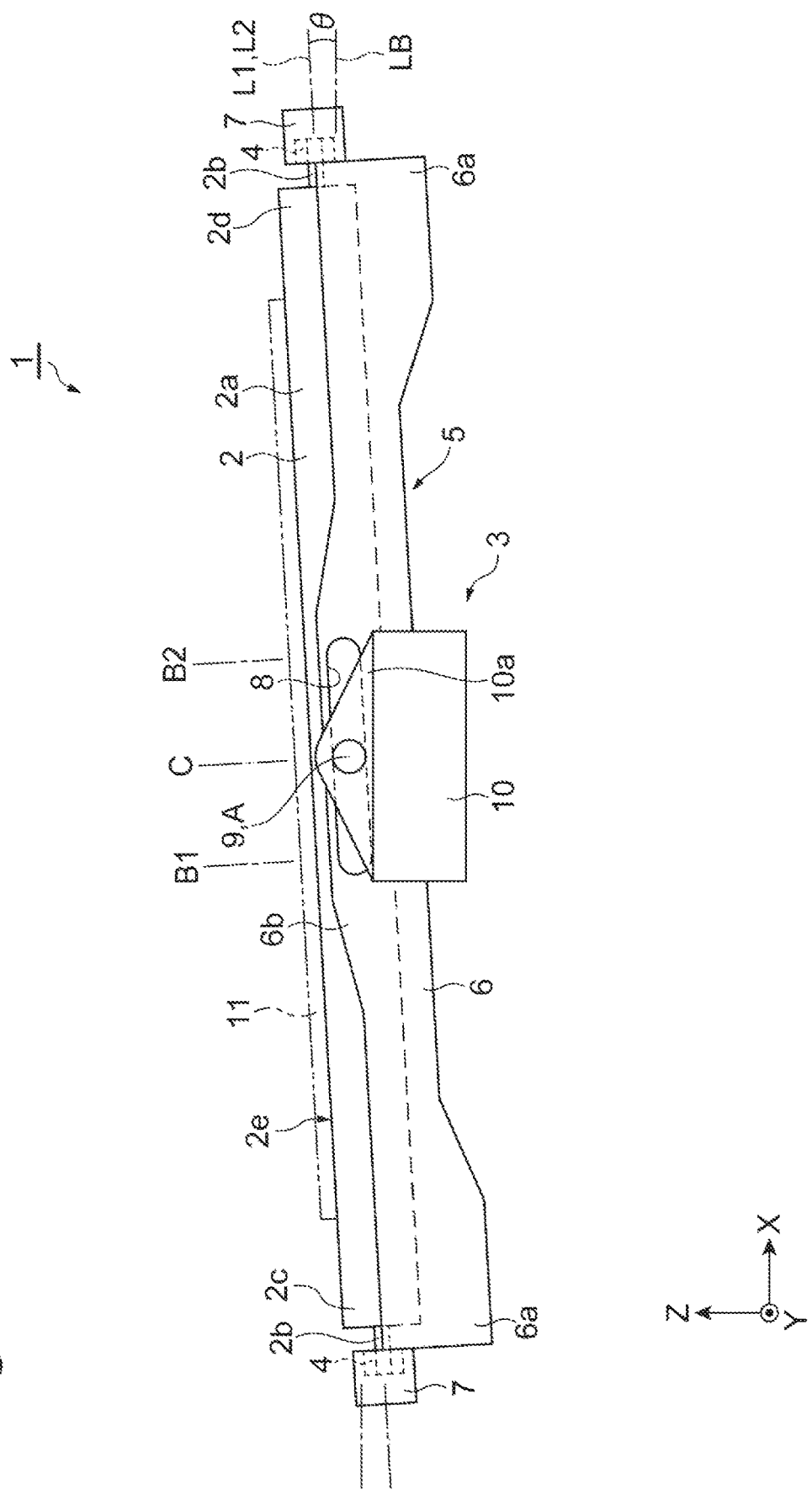
FIG. 3 is a front view of an example belt adjustment mechanism.
Figure 4:
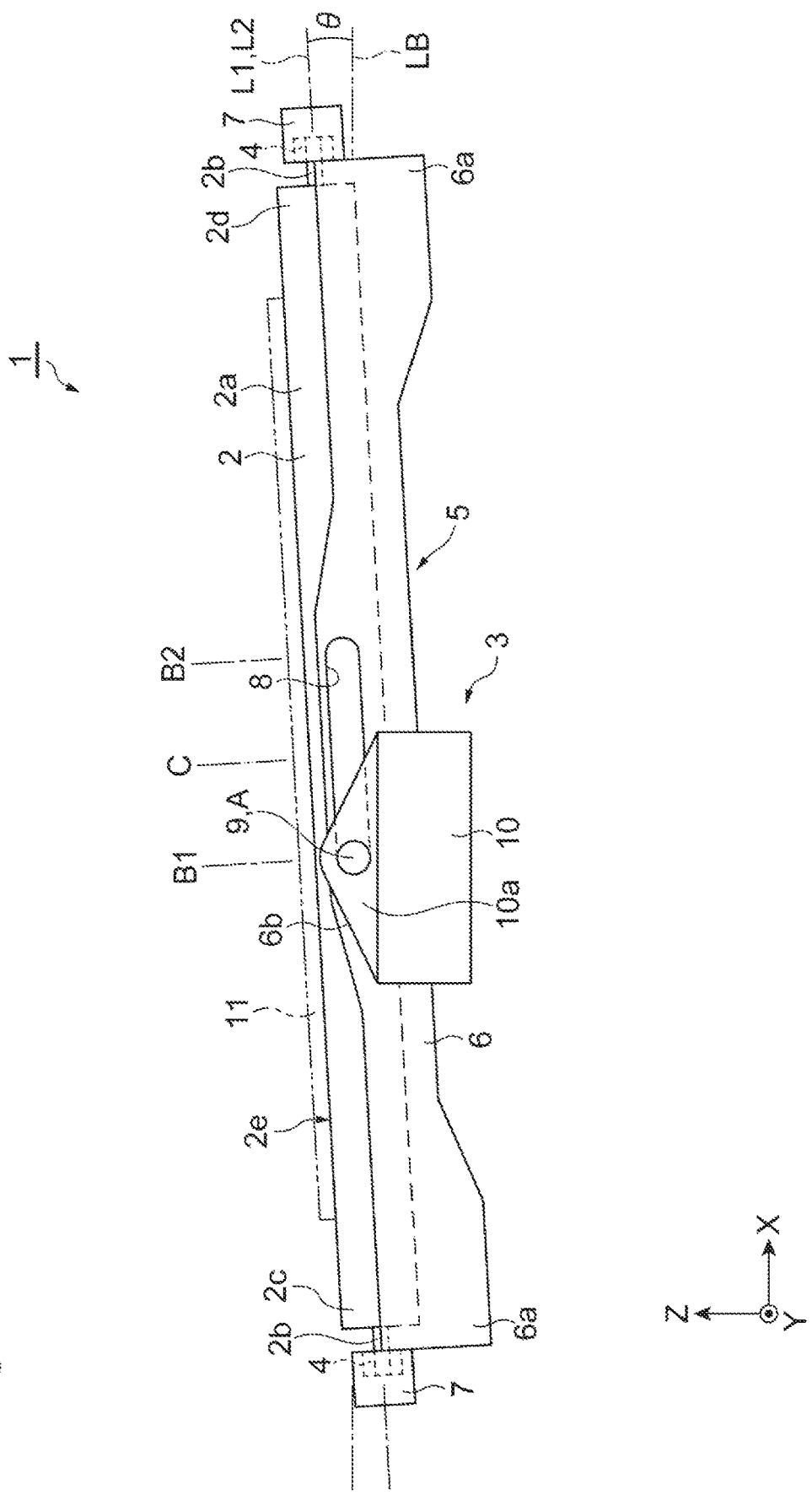
FIG. 4 is a front view of an example belt adjustment mechanism.

In states illustrated in FIG. 1 and FIG. 2, the steering roller 2 is in a non-inclination state (e.g. a neutral state or untitled state). In this state, the first end 2c and the second end 2d of the steering roller are located at the same position in the Z direction. In FIG. 3 and FIG. 4, a reference line LB represents an axial line along which the steering roller extends when the steering roller 2 is not inclined (or is not tilted). As illustrated in FIG. 3, the steering roller 2 can rotate (or pivot) around the pivot shaft 9. The steering roller 2 can rotate (or pivot) around the fulcrum A to be inclined. In FIG. 3, the second end 2d of the steering roller 2 is disposed at a higher position in comparison to the first end 2c. The first end 2c of the steering roller 2 may be disposed at a higher position in comparison to the second end 2d.

In FIG. 4, the pivot shaft 9 is disposed at the first position B1. The steering roller 2 can rotate around the pivot shaft 9 in a state in which the pivot shaft 9 is disposed at the first position B1. In FIG. 4, the second end 2d of the steering roller 2 is disposed at a higher position in comparison to the first end 2c. As illustrated in FIG. 2, in a state in which the pivot shaft 9 is disposed at the first position B1, a distance D2 from the pivot shaft 9 to the second end 2d is longer than a distance D1 from the pivot shaft 9 to the first end 2c. When comparing the cases illustrated in FIG. 3 and FIG. 4, in a case where an inclination angle θ of the steering roller 2 is the same in each case, and the position of the pivot shaft 9 in the Z direction is the same in each case, the position of the second end 2d illustrated in FIG. 4 is disposed at a position higher than the position of the second end 2d illustrated in FIG. 3. The inclination angle θ represents an inclination angle of the axial line L1 with respect to the reference line LB.

An endless belt 11 can come into contact with an outer peripheral surface 2e of the roller main body 2a of the steering roller 2. The steering roller 2 can rotate in accordance with movement of the endless belt 11. When the steering roller 2 is inclined and contacts the endless belt 11, the endless belt 11 may be displaced in the X direction. For example, when the first end 2c is displaced downward, away from the endless belt 11, and the second end 2d is displaced upward to engage the endless belt 11, tension on the first end 2c side becomes lower than tension of the endless belt 11 on the second end 2d side and the endless belt 11 is displaced to the second end 2d side (e.g. toward the second end 2d). When the first end 2c is displaced upward to engage the endless belt 11, and the second end 2d is displaced downward away from the endless belt, the endless belt 11 is displaced to the first end 2c side (e.g. toward the first end 2c). Accordingly, it is possible to correct or adjust a position of the endless belt 11 in the X direction.

In the belt adjustment mechanism 1, it is possible to adjust the position of the first end 2c and the second end 2d of the steering roller 2 in the Z direction. In the Z direction, the more the positions of the first end 2c and the second end 2d are spaced away from the reference line LB, the more the amount of movement of the endless belt 11 in the X direction can be increased. A positional deviation of the endless belt 11 in the X direction may be suppressed.

Figure 6:
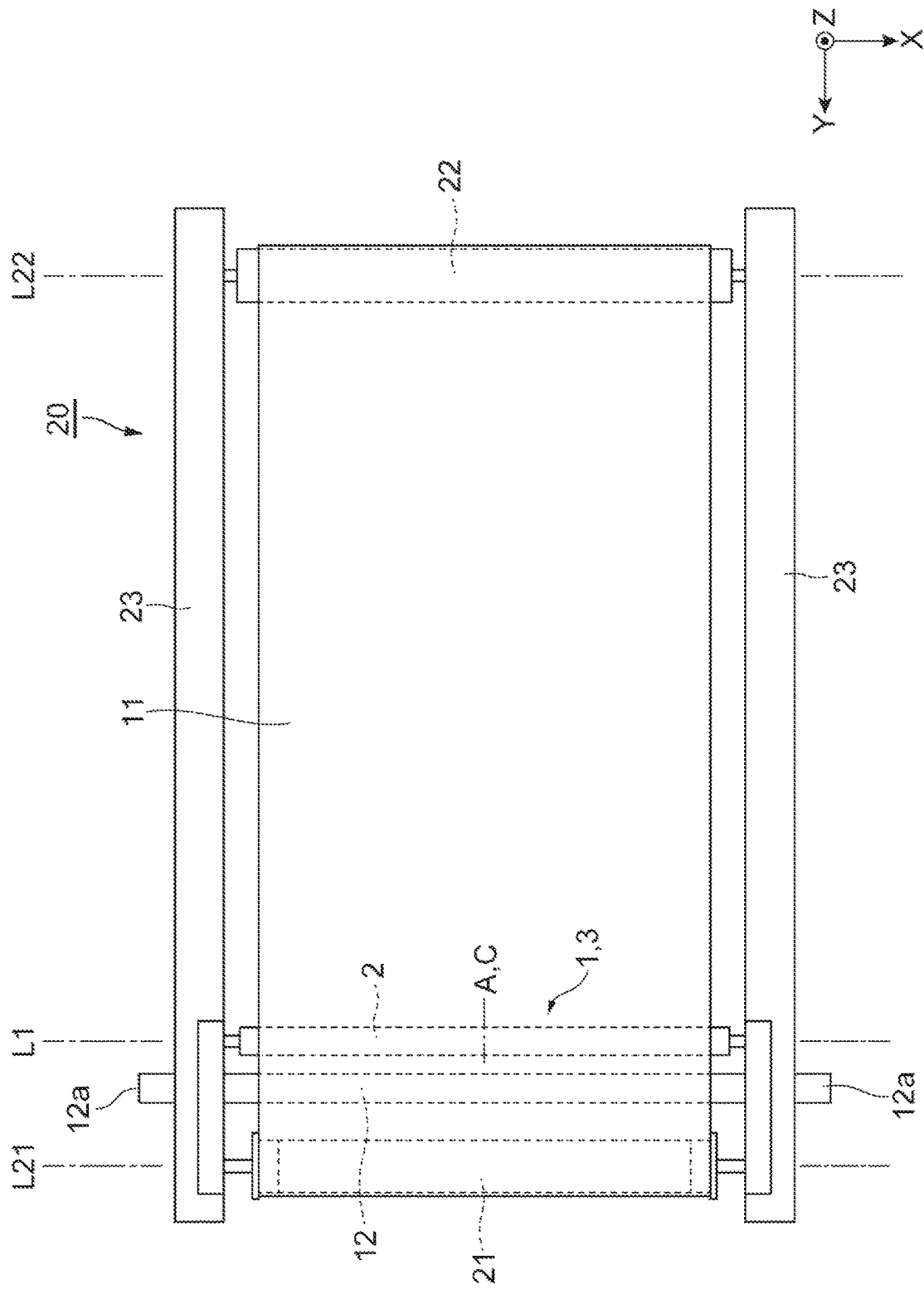
FIG. 6 is a plan view of an example belt driving device.

With reference to FIGS. 5 and 6, an example belt driving device 20 includes a first belt roller 21, a second belt roller 22, the steering roller 2, and an endless belt 11, The belt driving device 20 includes the belt adjustment mechanism 1. The belt adjustment mechanism 1 includes the positioning mechanism 3. The first belt roller 21 extends in a first direction, corresponding to the X direction, to rotate around an axial line L21 that extends in the X direction. For example, the first belt roller 21 has a columnar shape (or cylindrical shape). The first belt roller 21 may function as a driving roller, to rotate when power is transmitted thereto from an electric motor (not illustrated).

Figure 16:
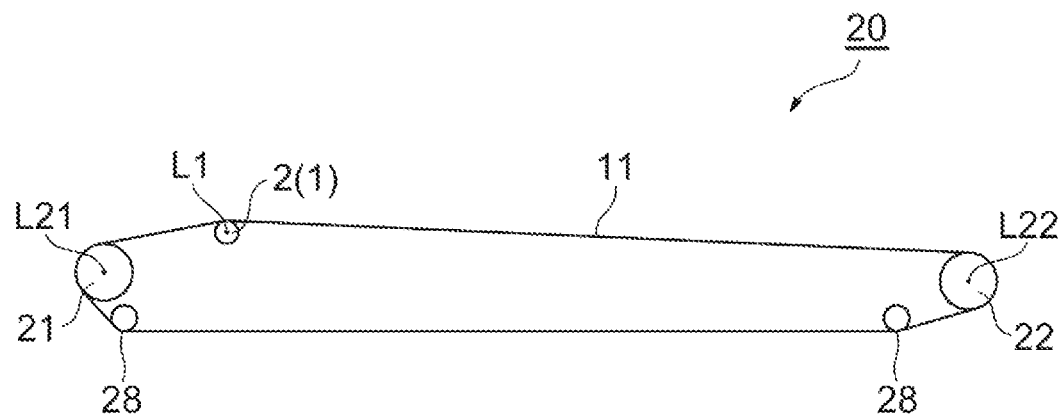
FIG. 16 is a side view of components of an example belt driving device.

The second belt roller 22 extends in the X direction is spaced apart from the first belt roller 21 in a second direction, corresponding to the Y direction, that intersects the first direction. The second belt roller 22 can rotate around an axial line L22 that extends in the X direction. For example, the second belt roller 22 has a columnar shape (or cylindrical shape), The second belt roller 22 may be a stretching roller, to function as a driven roller that rotates in accordance with movement of the endless belt 11. The belt driving device 20 may include a plurality of idle rollers 28 which are disposed between the first belt roller 21 and the second belt roller 22 in the Y direction (with reference to FIG. 16). The idle rollers 28 may be stretching rollers that can rotate around an axial line that extends in the X direction. For example, the idle rollers 28 may be in contact with the endless belt 11 on a lower side. The idle rollers 28 can rotate in accordance with movement of the endless belt 11.

The steering roller 2 is disposed between the first belt roller 21 and the second belt roller 22 in the Y direction. In some examples, the steering roller 2 may be disposed at a position that is closer to the first belt roller 21 in comparison to a center in the Y direction between the first belt roller 21 and the second belt roller 22. In some examples, the steering roller 2 may be disposed at a position that is closer to the second belt roller 22 in comparison to the center in the Y direction. The axial line L1 of the steering roller 2 may be disposed at a position that is higher in the Z direction, in comparison to a position of the axial line L21 of the first belt roller 21. The steering roller 2 may be arranged to contact the endless belt 11 from below.

As illustrated in FIG. 6, the belt driving device 20 includes a pair of frames 23 extending in the Y direction. The pair of frames 23 are disposed to be spaced away from each other in the X direction and to rotatably support the first belt roller 21 and the second belt roller 22.

Figure 7:
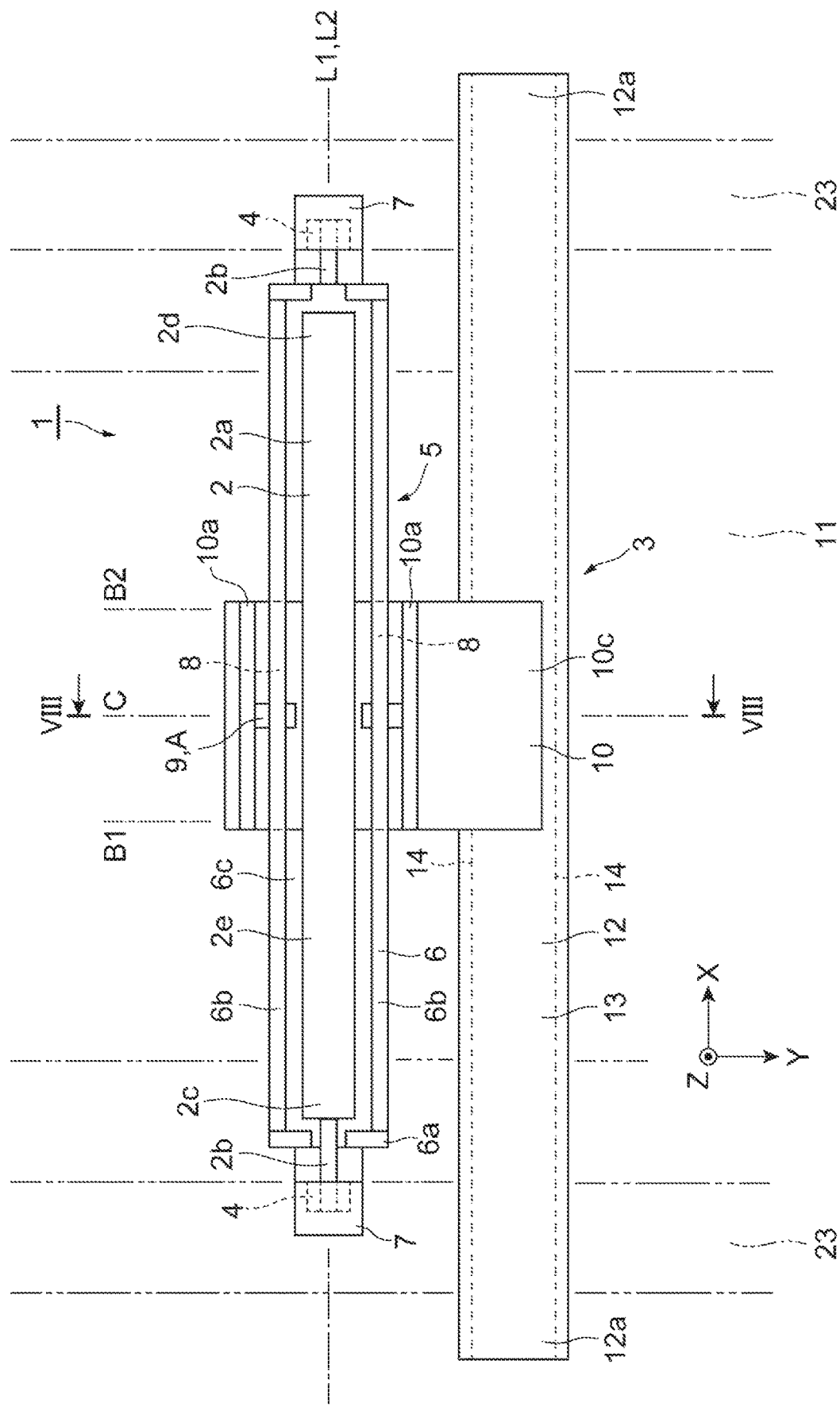
FIG. 7 is a plan view of an example belt adjustment mechanism.
Figure 8:
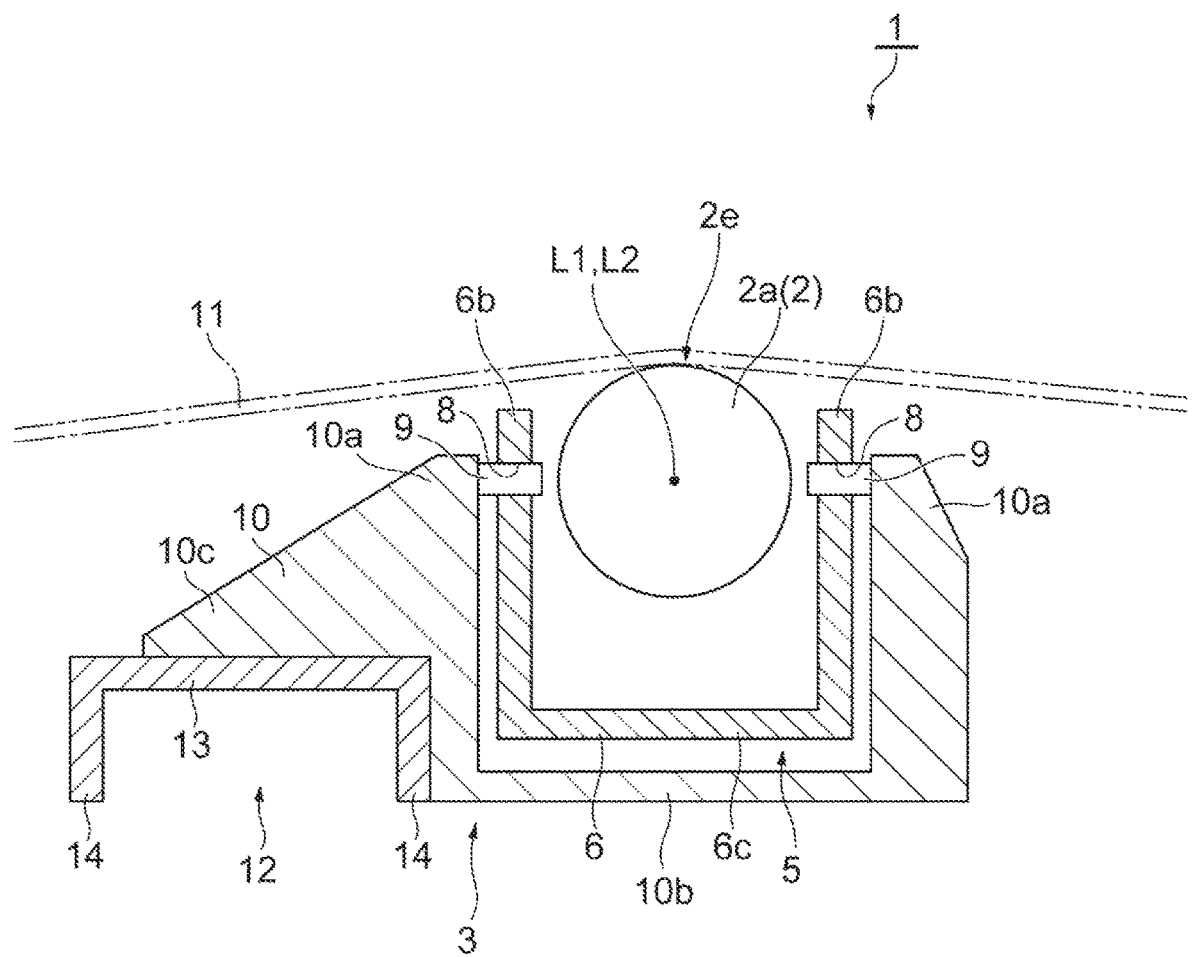
FIG. 8 is a cross-sectional view of the example belt adjustment mechanism of FIG. 7, taken along line VIII-VIII.

With reference to FIGS. 7 and 8, an example belt adjustment mechanism 1 will be described. The steering roller holding member main body 6 may include a bottom plate 6c. The bottom plate 6c extends in the longitudinal direction L2 of the steering roller 2 and connects the pair of side plates 6b to each other. The bottom plate 6c has a thickness in the Z direction, defining a plate thickness direction of the bottom plate 6c. The steering roller 2 is disposed in a space that is substantially surrounded by the pair of side plates 6b and the bottom plate 6c. In a peripheral direction of the steering roller 2, a part of an outer peripheral surface 2e of the steering roller is opened (or exposed) to the outside of the steering roller holding member main body 6, Along the outer peripheral surface 2e, a portion on an upward side of the side plates 6b is exposed to the outside, and can come into contact with the endless belt 11.

The pivot shaft holding member 10 may include a bottom portion 10b as illustrated in FIG. 8. The bottom portion 10b may be extend in the Y direction. The bottom portion 10b extends from lower ends of the side portions 10a in the Y direction. The bottom portion 10b is disposed to face the bottom plate 6c in the Z direction. The bottom portion 10b is disposed on a side opposite to the steering roller 2 relative to the bottom plate 6c set as a reference.

The pivot shaft holding member 10 may include an overhanging portion 10c that overhangs from one side portion 10a. For example, the overhanging portion 10c may overhangs toward the first belt roller 21 in the Y direction.

Figure 9:
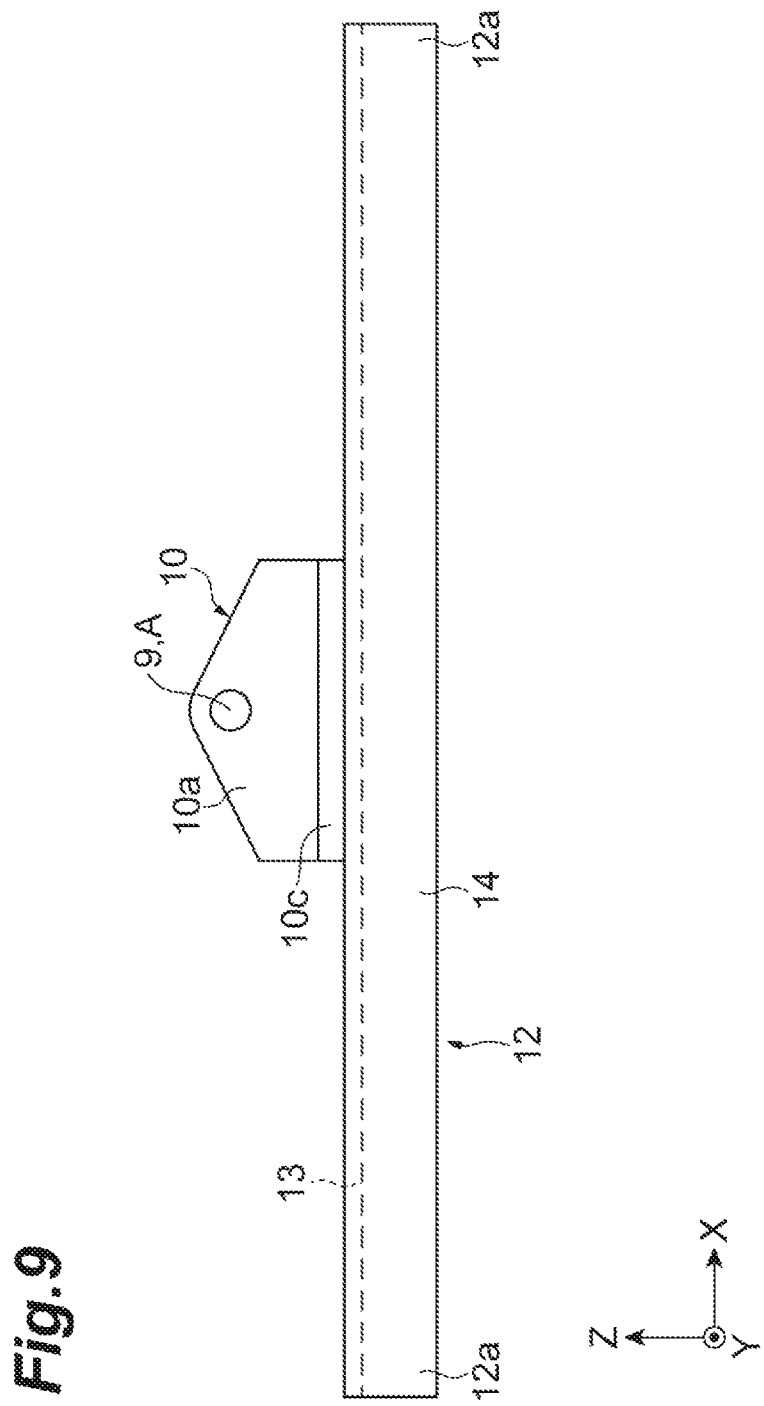
FIG. 9 is a side view of components of an example positioning mechanism in an example belt adjustment mechanism, showing an example pivot shaft holding member and an example slide member.

As illustrated in FIG. 7 to FIG. 9, the example positioning mechanism 3 may include a slide member 12 coupled to the pivot shaft holding member 10, and extending along the X direction. For example, the slide member 12 is disposed between the first belt roller 21 and the steering roller 2 in the Y direction. The slide member 12 may include a plate portion 13 and a pair of side plates 14. The plate portion 13 has a thickness in the Z direction, defining a plate thickness direction of the plate portion 13. The pair of side plates 14 are disposed to be spaced away from each other in the Y direction. The side plates 14 have a thickness in the Y direction, defining a plate thickness direction of the side plates 14. The pair of side plates 14 extends downward from the plate portion 13. The overhanging portion 10c of the pivot shaft holding member 10 is attached to an upper surface of the plate portion 13. A lower end of each of the side portions 10a of the pivot shaft holding member 10 may be in contact with the side plates 14 in the Y direction. The pivot shaft holding member 10 is fixed to the slide member 12 and can move integrally with the slide member 12.

The slide member 12 may further overhangs to an outer side relative to the frame 23 in the X direction. An end 12a of the slide member 12 may extend in a longitudinal direction further out relative to the frame 23 in the X direction. It is possible to move the slide member 12 in the X direction by operating the end 12a. In some examples, a user can move the slide member 12 by pressing against the end 12a. In some examples, the slide member 12 may be moved by operating the end 12a via a link mechanism. The end 12a of the slide member 12 may be moved further inside relative to the frame 23 in the X direction. An inner side of the frame 23 in the X direction may be defined as a side at which the slide member 12 exists or as a side between the frames 23. An outer side of the frame 23 in the X direction may be a side opposite to the endless belt 11 or opposite the inner side of the frame 23.

As illustrated in FIG. 10, an opening 24 may be formed in the frame 23, having a shape that corresponds to a shape of the slide member 12. The slide member 12 may penetrate through the frame 23 through the opening 24. An inner wall of the opening 24 may include a surface that can come into contact with the slide member 12.

The positioning mechanism 3 may include a slide guide 25 to guide a movement of the slide member 12. The slide guide 25 is attached to the frame 23 and extends in the X direction. The slide guide 25 may extend from the inner side to the outer side of the frame 23 in the X direction. The slide guide 25 may include a guide plate 26, and a pair of side plates 27, The guide plate 26 has a thickness in the Z direction, defining a plate thickness direction of the guide plate 26. The guide plate 26 faces the plate portion 13 in the Z direction. The guide plate 26 may include a guide surface 26a that can come into contact with a bottom surface of the plate portion 13, A movement of the plate portion 13 in the X direction is guided with engagement with the guide surface 26a.

The pair of side plates 27 are spaced apart from each other in the Y direction. The side plates 27 have a thickness in the Y direction, defining a plate thickness direction of the side plates 27. The pair of side plates 27 extend downward from the guide plate 26. The side plates 27 face the side plates 14 in the Y direction. The side plates 27 and the side plates 14 may come into contact with each other in the Y direction. Accordingly, it is possible to restrict a position of the slide member 12 with respect to the slide guide 25 in the Y direction.

The positioning mechanism 3 may include a positioning mechanism 30. The positioning mechanism 30 positions the slide member 12 with respect to the slide guide 25. The positioning mechanism 30, also referred to as a first slide member positioning mechanism 30, may include the slide guide 25 and a positioning pin 31. A positioning opening 32 is provided in the plate portion 13 of the slide member 12. The positioning opening 32 passes through the plate portion 13 in the Z direction. A shape of the positioning opening 32 matches a shape of the positioning pin 31. An outer peripheral surface of the positioning pin 31 can come into contact with an inner peripheral surface of the positioning opening 32. For example, the positioning pin 31 may have a columnar shape.

A positioning hole 33 is provided in the guide plate 26 of the slide guide 25, as a depression from the guide surface 26a, and has shape that matches the positioning pin 31. The positioning pin 31 is inserted through the positioning opening 32 (with reference to FIG. 11) and is fitted into the positioning hole 33. Accordingly, a position of the slide member 12 is restricted with respect to the slide guide 25.

Figure 11:
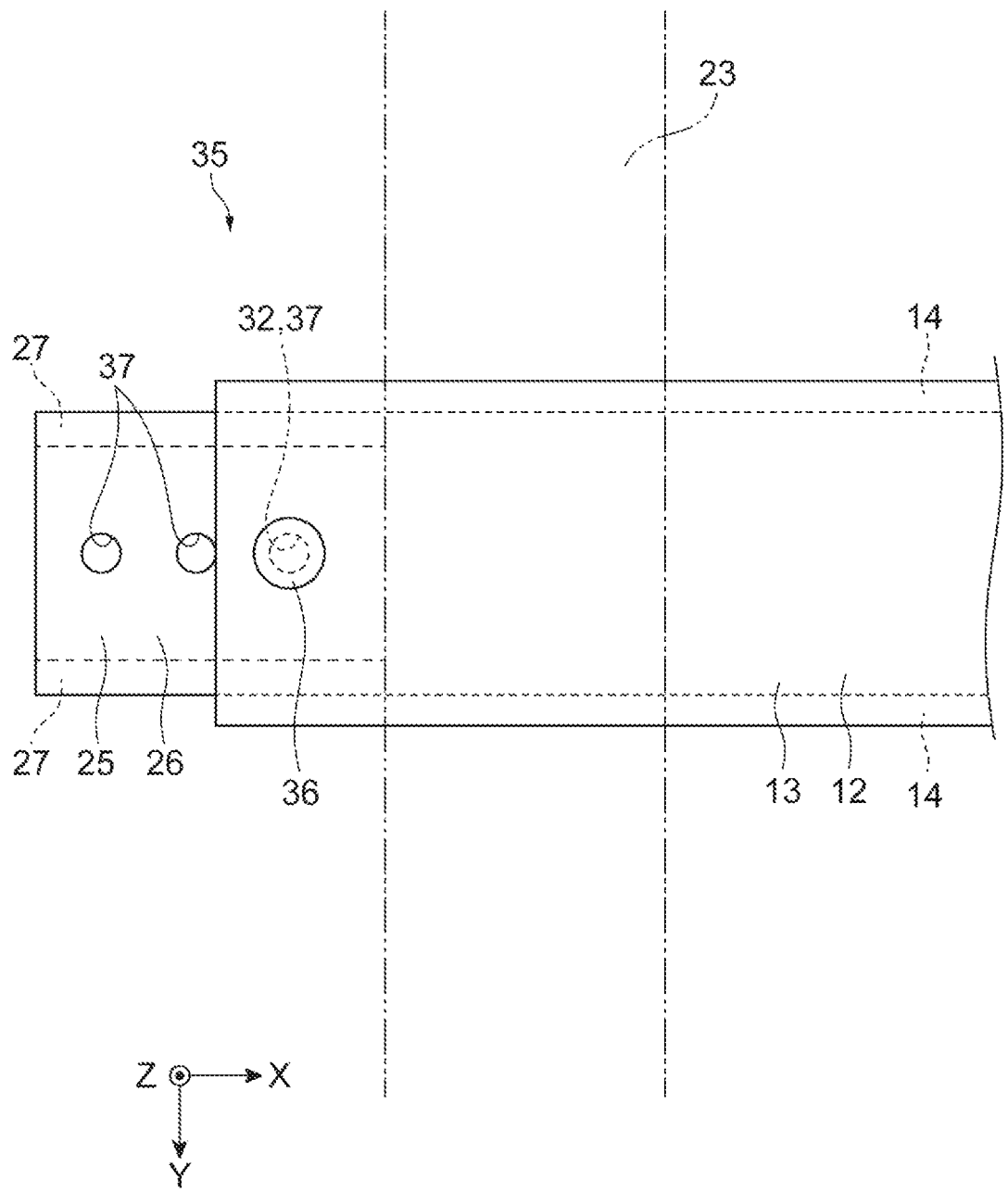
FIG. 11 is a plan view showing components of an example positioning mechanism, including an example slide member.

As illustrated in FIG. 11, the positioning mechanism 3 may include a positioning mechanism 35 to position the slide member 12 with respect to the slide guide 25. The positioning mechanism 35, also referred to as a second slide member positioning mechanism 35, may include the slide guide 25 and a positioning screw 36. A positioning female screw portion 37 is provided in the guide plate 26 of the slide guide 25, The positioning female screw portion 37 is provided at a plurality of sites in the X direction. The positioning screw 36 is attached in correspondence with a position of the positioning opening 32 of the slide member 12. The positioning screw 36 is insertable through the positioning opening 32 and attachable to the positioning female screw portion 37, in order to press the guide plate 26 against the slide guide 25. Accordingly, the position of the slide member 12 is restricted with respect to the slide guide 25.

Figure 12:
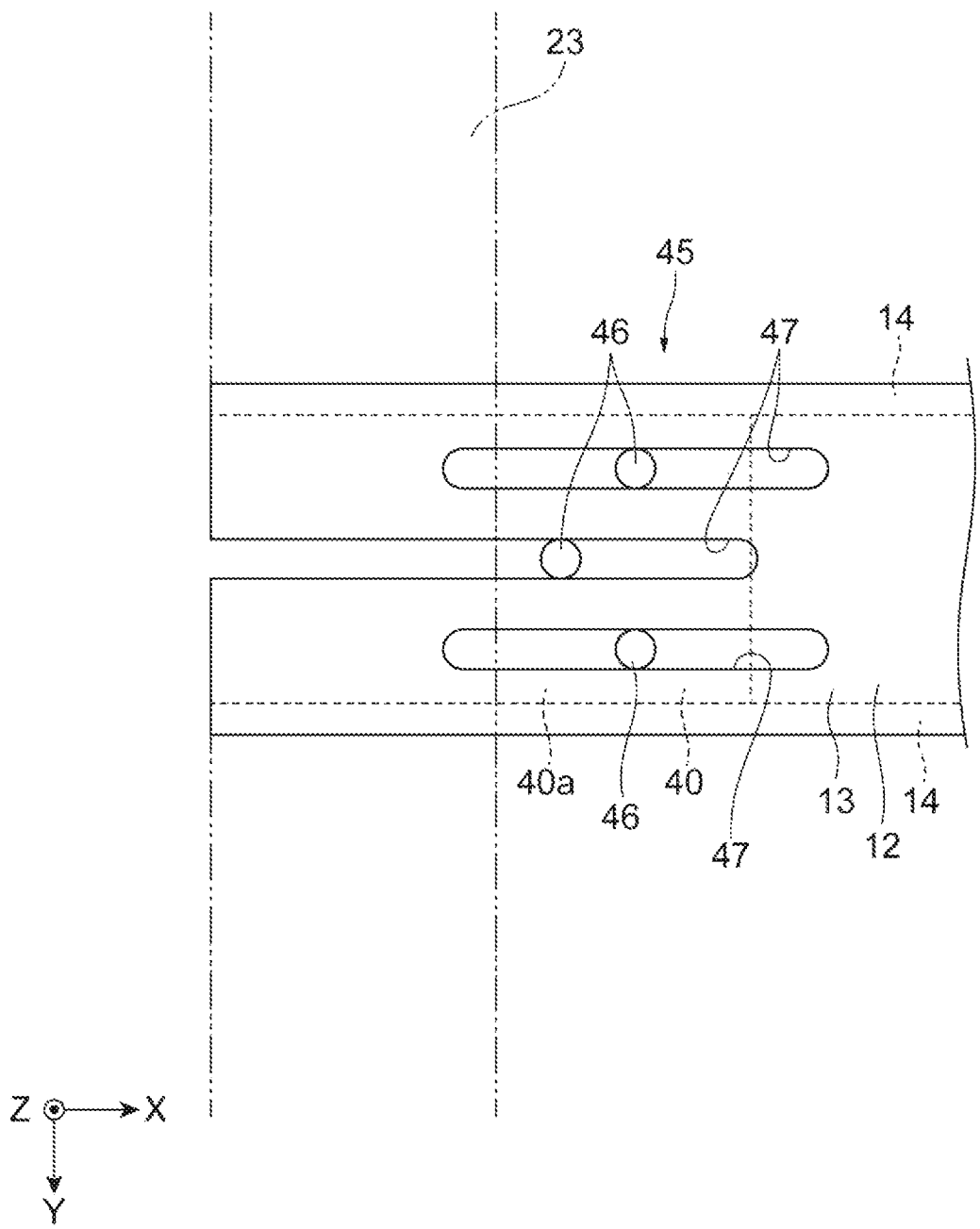
FIG. 12 is a plan view of components of an example positioning mechanism, including an example slide member and an example slide guide.

As illustrated in FIG. 12, the positioning mechanism 3 may include a slide guide 40 that guides movement of the slide member 12. The slide guide 40 is attached to the frame 23, and extends in the X direction. The slide guide 40 may extend from an inner side to an outer side of the frame 23 in the X direction. The slide guide 40 may include a guide surface 40a to contact (or engage with) the bottom surface of the plate portion 13, in order to support the slide member 12 from below, as a slide holding member. A movement of the plate portion 13 in the X direction is guided with contact between the plate portion 13 and the guide surface 40a.

The positioning mechanism 3 may include a positioning mechanism 45 to position the slide member 12 with respect to the slide guide 40. The positioning mechanism 45, also referred to as a third slide member positioning mechanism 45, may include the slide guide 40 and a positioning convex portion 46. A positioning opening 47 is provided in the plate portion 13 of the slide member 12. The positioning opening 47 may pass through the thickness of the plate portion 13 in the Z direction and may be an elongated hole that extends in the X direction, A width of the positioning opening 47 in the Y direction matches the size of the positioning convex portion 46. For example, a length of the positioning opening 47 in the X direction may correspond to a movement range of the slide member 12.

For example, an external shape of the positioning convex portion 46 may have circular shape when viewed from the Z direction. The positioning convex portion 46 may protrude from the guide surface 40a in the Z direction, to be inserted into the positioning opening 47 in the Z direction. An outer peripheral surface of the positioning convex portion 46 can come into contact with an inner surface of the positioning opening 47. A plurality of the positioning convex portions 46 may be disposed in the Y direction. The plurality of positioning convex portions 46 may be disposed at various positions in the X direction. The slide member 12 may be guided by the positioning convex portions 46 to slide in the X direction. A position of the slide member 12 in the Y direction is restricted by the positioning convex portion 46.

In some examples, the slide guides 25 and 40 may be superimposed on the frame 23 in the X direction.

Figure 13:
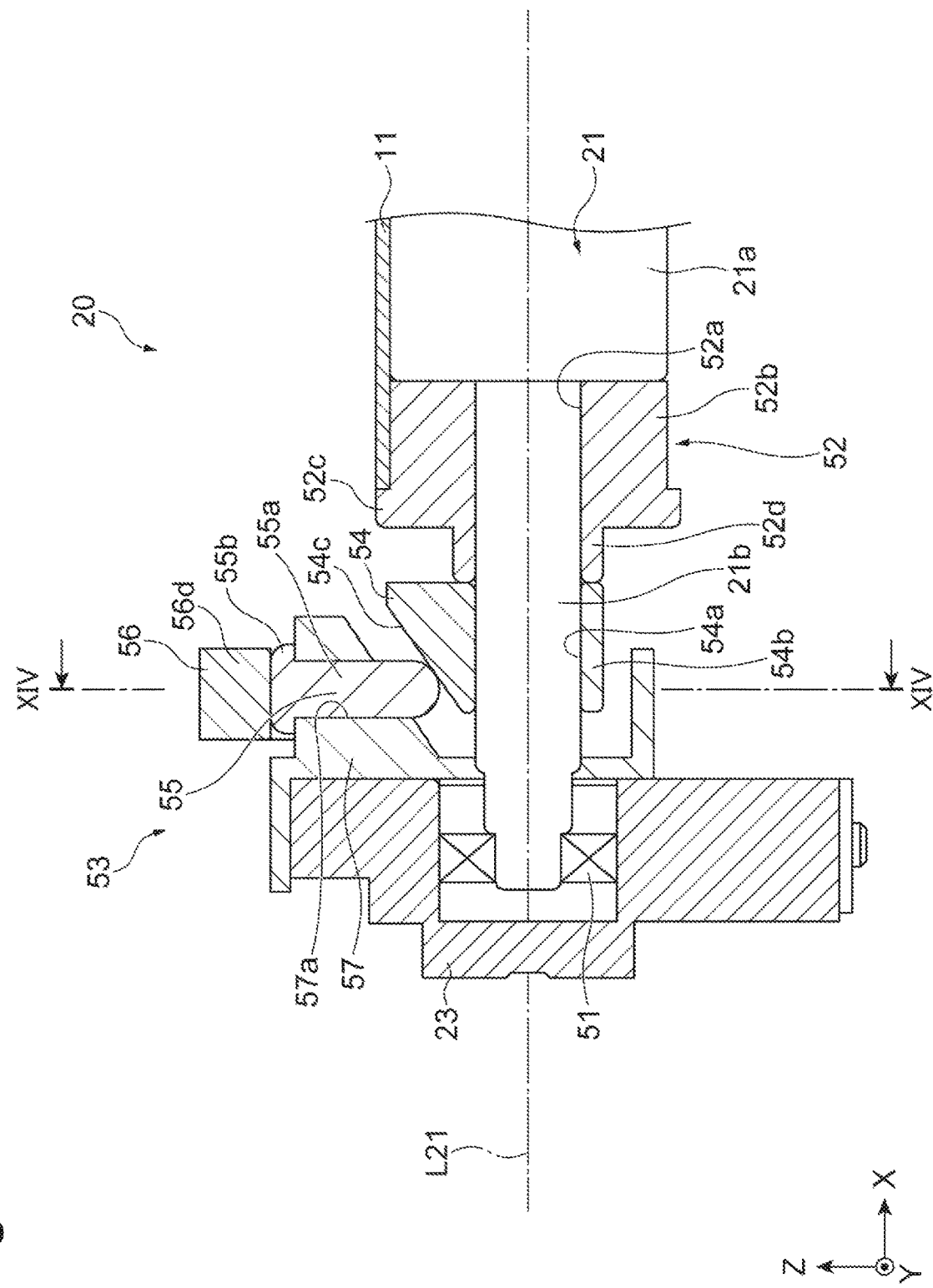
FIG. 13 is a cross-sectional view of components of an example belt driving device, showing an end structure of an example first belt roller of the example belt driving device.

With reference to FIG. 13, an example of an end structure of the first belt roller 21 of an example belt driving device 20, will be described. The first belt roller 21 may include a first belt roller main body 21a and a small-diameter portion 21b. The small-diameter portion 21b extends from an end of the first belt roller main body 21a toward an outer side, in the X-direction. A length of the endless belt 11 in the X direction is longer than a length of the first belt roller main body 21a in the X direction. In the X direction, the endless belt 11 extends further to the outer side relative to the first belt roller main body 21a. The belt driving device 20 may include a bearing 51 that rotatably supports the first belt roller 21. The bearing 51 may be a cylindrical sleeve, or may include other structures depending on examples.

The example belt driving device 20 may include a wheel (or pulley) 52 and a link mechanism 53 as illustrated in FIG. 13. For example, the wheel 52 is attached to the first belt roller 21. The wheel 52 is an adjustment member that can move in the X direction in accordance with movement of the endless belt 11 in the X direction.

A central opening 52a is formed in the wheel 52. The small-diameter portion 21b can be inserted into the central opening 52a The wheel 52 includes a main body portion 52b, a flange portion 52c, and a small-diameter portion 52d. For example, the main body portion 52b may have a columnar shape. The central opening 52a is formed at the center of the main body portion 52b. An outer diameter of the main body portion 52b is approximately the same as an outer diameter of the first belt roller main body 21a. An outer peripheral surface of the main body portion 52b can come into contact with the endless belt 11.

The flange portion 52c extends further toward an outer side relative to the outer peripheral surface of the main body portion 52b in a radial direction. The flange portion 52c is formed over the entire periphery in a peripheral direction of the wheel 52. The flange portion 52c is located on a side opposite to the first belt roller main body 21a in the X direction. The flange portion 52c may extend further to an outer side relative to an outer surface of the endless belt 11 in a radial direction. The outer surface of the endless belt 11 is a surface opposite to the first belt roller 21. An inner surface of the endless belt 11 is a surface that aligns with the first belt roller 21 and can come into contact with the first belt roller 21. An end surface of the endless belt 11 is an end surface on an outer side in the X direction.

The flange portion 52c includes a surface that can come into contact with the end surface of the endless belt 11 in the X direction. For example, in a case where a position of the endless belt 11 deviates to an outer side in the X direction, the end surface of the endless belt 11 comes into contact with the flange portion 52c, The wheel 52 receives the positional deviation of the endless belt 11, and can slide in the X direction.

The small-diameter portion 52d of the wheel 52 extends further to an outer side in comparison to the flange portion 52c in the Z direction. The small-diameter portion 52d includes a cylindrical portion having a diameter smaller than that of the main body portion 52b. The central opening 52a is formed at the center of the small-diameter portion 52d.

The link mechanism 53 may include a first intermediate member 54, a pin member 55, and a second intermediate member 56. The first intermediate member 54 is mounted on the first belt roller 21, via the opening 54a, and is located between the wheel 52 and the bearing 51 in the X direction. When the wheel 52 is moved outwardly in the X direction, the first intermediate member 54 is pressed by the wheel 52 and moves outward in the X direction. The small-diameter portion 21b of the first belt roller 21 is inserted into the opening 54a.

The first intermediate member 54 includes a main body portion 54b in which the opening 54a is formed. An inclined surface 54c is formed on an outer surface of the main body portion 54b, for example on an upper side. The inclined surface 54c is inclined to be spaced further away from the axial line L21, from an outer side to an inner side in the X direction. In other words, the inclined surface 54c is inclined to be gradually higher toward the inner side relative to the outer side in the X direction. Accordingly, when the first intermediate member 54 moves to the outer side in the X direction, it is possible to push up a member that comes into contact with the inclined surface 54c (e.g. the inclined surface 54c may lift a member that engages the inclined surface 54c).

Figure 14:
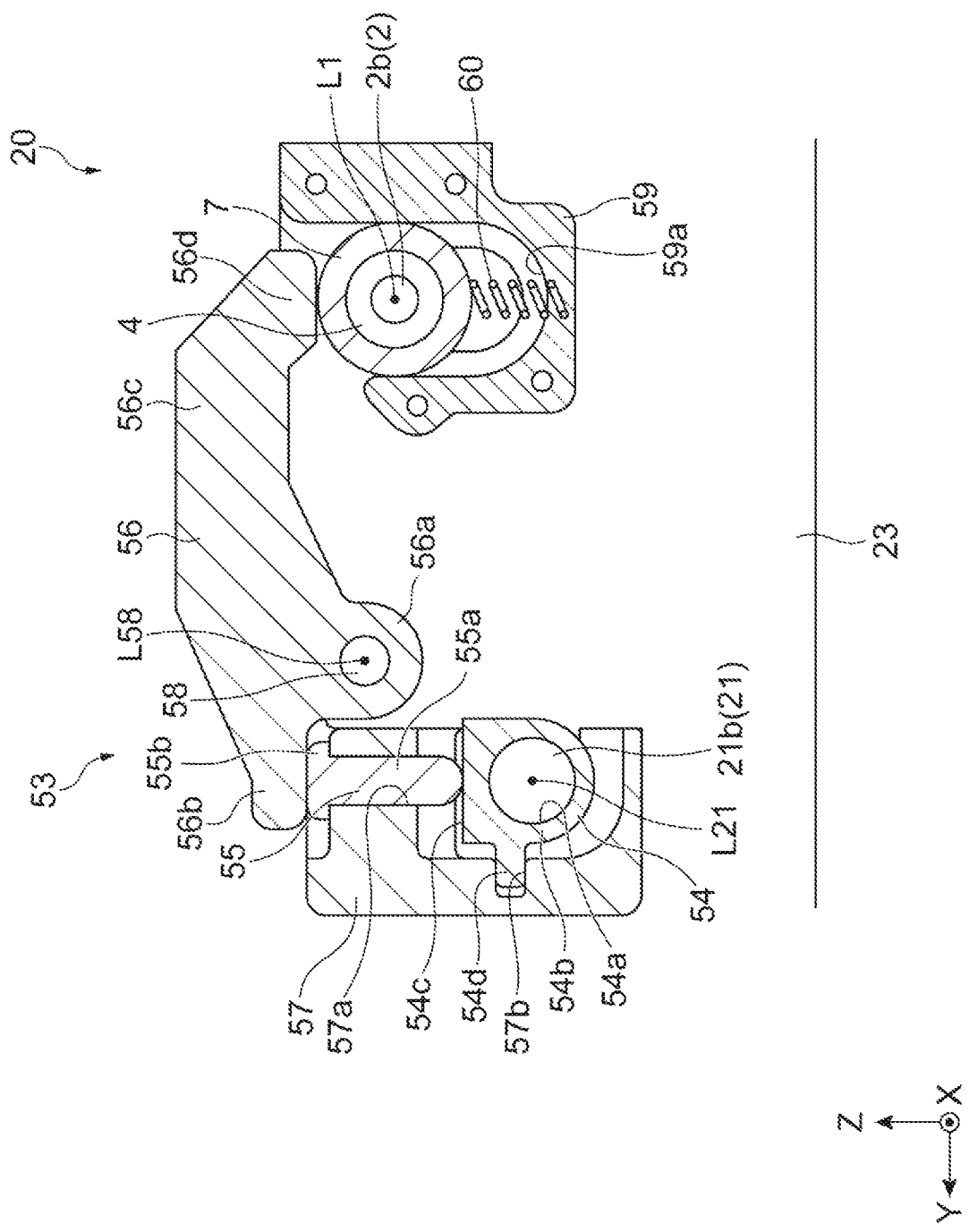
FIG. 14 is a cross-sectional view of an example link mechanism of the example belt driving device of FIG. 13, taken along line XIV-XIV in FIG. 13.

With reference to FIG. 14, the main body portion 54b includes a protruding piece 54d that projects outwardly from at a side portion of the main body portion 54b. For example, the protruding piece 54d may extend in the X direction in a plate shape. The protruding piece 54d may extend in a direction in which the opening 54a passes. The protruding piece 54d has a thickness in the Z direction, defining a plate thickness direction of the protruding piece 54d.

The pin member 55 may include a main body portion 55a has a columnar shape extending in the X direction, and a flange portion 55b that extends from the main body portion 55a to an outer side in a radial direction. The flange portion 55b is formed at an upper end of the main body portion 55a, A lower end of the main body portion 55a may include a spherical surface.

The link mechanism 53 may include a holding member 57 attached to the frames 23, and including a pin member supporting portion 57a and a first intermediate member guide portion 57b. An opening, which passes through the pin member supporting portion 57a in the Z direction, is formed in the pin member supporting portion 57a, to receive therein the pin member 55. The flange portion 55b can come into contact with has a surface on an edge portion of the opening, in order to restrict a position of the pin member 55 in the Z direction. When the flange portion 55b comes into contact with the edge portion of the opening, a downward movement of the pin member 55 is restricted.

The first intermediate member guide portion 57b includes a guide groove to guide a movement of the protruding piece 54d of the first intermediate member 54. The first intermediate member guide portion 57b is arranged to face the first intermediate member 54 in the Y direction. A guide groove extending in the X direction, is provided in a surface of the first intermediate member guide portion 57b which faces the first intermediate member 54, The protruding piece 54d of the first intermediate member 54 is inserted into the guide groove. The protruding piece 54d is movable along the guide groove, to guide a movement of the first intermediate member 54 in the X direction.

The second intermediate member 56 may include a fulcrum portion 56a, a receiving portion 56b, an extending portion 56c, and a pressing portion 56d, The second intermediate member 56 can swing (or pivot) around the fulcrum portion 56a that is a pivot portion. An opening is formed in the fulcrum portion 56a, to receive a supporting shaft 58. For example, the supporting shaft 58 may be attached to the frames 23 and extend from the frames 23 to the inner side of the frame 23, in the X direction. The supporting shaft 58 may be located between the first belt roller 21 and the steering roller 2 in the Y direction. The fulcrum portion 56a can rotate around the supporting shaft 58. For example, an axial line L58 of the supporting shaft 58 may be disposed on higher relative to the axial lines L21 and L1 in the Z direction.

The receiving portion 56b is connected to the fulcrum portion 56a and extends outwardly in the Y direction. The receiving portion 56b extends toward the first belt roller 21 in the Y direction. The receiving portion 56b is located higher, relative to the fulcrum portion 56a. The receiving portion 56b extends to engage with an upper end of the pin member 55. The receiving portion 56b can come into contact with the upper end of the pin member 55. The receiving portion 56b is displaced in accordance with movement of the pin member 55 in the Z direction. When the pin member 55 moves upward, the receiving portion 56b moves upward together with the receiving portion 56b.

The extending portion 56c is connected to the fulcrum portion 56a and extends inward in the Y direction toward a side opposite to the receiving portion 56b. The extending portion 56c is higher relative to the fulcrum portion 56a and relative to a bearing holding member 7. The extending portion 56c is arranged to swing (or pivot) in accordance with a rotation (or pivotal movement) of the fulcrum portion 56a. The pressing portion 56d located at a tip end of the extending portion 56c, includes a surface to engage with an outer surface of the bearing holding member 7. When the extending portion 56c swings or pivots, the pressing portion 56d moves downward, presses against the bearing holding member 7, and presses down the bearing 4 and in turn the first end 2c of the steering roller 2.

The link mechanism 53 may include a connection tool 59 that is connected to the frames 23. The connection tool 59 may include an accommodation portion 59a that accommodates the bearing holding member 7. The connection tool 59 may include a surface that guides a movement of the bearing holding member 7 in the Z direction. The connection tool 59 can hold a spring member 60 extending in the Z direction, and supporting the bearing holding member 7 from below. A lower end of the spring member 60 is supported by the connection tool 59. An upper end of the spring member 60 can come into contact with a bottom surface of the bearing holding member 7. The spring member 60 is stretchable in the Z direction, and can bias the bearing holding member 7 to an upward side.

An operation of the belt driving device 20 will be described. Power is transmitted to the endless belt 11 by the first belt roller 21, and thus the endless belt 11 moves around. The second belt roller 22 rotates in accordance with movement of the endless belt 11. The steering roller 2 rotates in accordance with movement of the endless belt 11.

When the endless belt 11 deviates (e.g. is displaced) to an outer side in a width direction, an end surface of the endless belt 11 comes into contact with the flange portion 52c of the wheel 52. When the amount of movement of the endless belt 11 in the width direction increases, the endless belt 11 presses the wheel 52. When the wheel 52 moves outward in the X direction, the pin member 55 is lifted up by the inclined surface 54c, in turn lifting up the receiving portion 56b of the second intermediate member 56, and thus the second intermediate member 56 swings around the axial line L18.

Accordingly, the pressing portion 56d is displaced downward, and presses down against the bearing holding member 7. As illustrated in FIG. 3, the first end 2c of the steering roller 2 moves downward, and the steering roller 2 is inclined.

When the steering roller 2 is inclined, tension of the endless belt 11 on the first end 2c side is weakened. In the endless belt 11, tension on the first end 2c side becomes lower than tension of the endless belt 11 on the second end 2d side. Accordingly, the endless belt 11 moves to the second end 2d side in the width direction, and as a result, positional deviation of the endless belt 11 is corrected.

When the endless belt 11 moves to the second end 2d side, a force of pushing out the wheel 52 in the X direction is weakened. Accordingly, the spring member 60 biases and pushes up the bearing holding member 7. Accordingly, the first end 2c moves upward, and lifts up the pressing portion 56d of the second intermediate member 56. In response to the extending movement of the pressing portion 56d, the receiving portion 56b moves downward, pressing down the pin member 55. When the pin member 55, which comes into contact with the inclined surface 54c, moves downward, the first intermediate member 54 moves inward in the X direction. The wheel 52 is pressed back by the first intermediate member 54, and returns to an original position as illustrated in FIG. 13. The first end 2c of the steering roller 2 returns to an original position as illustrated in FIG. 1.

With reference to FIGS. 2 and 7, the pivot shaft 9 may be moved in the X direction, by moving the slide member 12 in the X direction by pressing the end 12a of the slide member 12, in order to increase or vary the amount of movement of the second end 2d of the steering roller 2 in the Z direction, with further reference to FIG. 4. The amount of movement of the second end 2d to an upward side may be further increased relative to the amount of movement of the first end 2c to a downward side. The more the pivot shaft 9 approaches the first end 2c side, the more the displacement of the second end 2d can be increased. In the endless belt 11, a difference between a tension on the first end 2c side and a tension on the second end 2d side may be increased. The difference in tensions when the pivot shaft 9 is positioned at the first position B1 is greater than the difference in tensions when the pivot shaft 9 is positioned at a position of the center C1 As a result, it is possible to adjust the degree of position correction of the endless belt 11.

In examples of the belt driving device 20, it is possible to use an endless belt 11 without any ribs provided on an edge of the endless belt. In examples of the belt driving device 20, positional deviation of the endless belt 11 in the width direction may be corrected, to suppress meandering of the endless belt 11. In examples of the belt driving device 20, a deformation of the endless belt 11 due to a deviation in a stretching force of the endless belt 11 may be suppressed. Since the deformation of the endless belt 11 is suppressed, it is possible to prevent deformation like waving.

In some examples, the belt driving device 20 may have a configuration including an adjustment member (pressing member) that moves in a longitudinal direction of the steering roller 2 in accordance with movement of the endless belt 11 in the longitudinal direction of the steering roller 2, and a link mechanism that can incline the steering roller 2 in accordance with movement of the adjustment member. The belt driving device 20 receives a pressure of an end of the endless belt 11 due to the adjustment member disposed at the end of the steering roller 2, and displaces the end of the steering roller 2, thereby inclining the steering roller 2.

For example, the belt driving device 20 may be used as a transfer unit in an image forming apparatus such as a printer. The transfer unit can secondarily transfer a toner image that is developed by a developing unit onto a sheet. The endless belt 11 can be used as an intermediate transfer belt in the transfer unit. The belt driving device 20 can be used as a sheet conveying unit that conveys a sheet. The endless belt 11 can be used as a sheet conveying belt in the sheet conveying unit.

Figure 15:
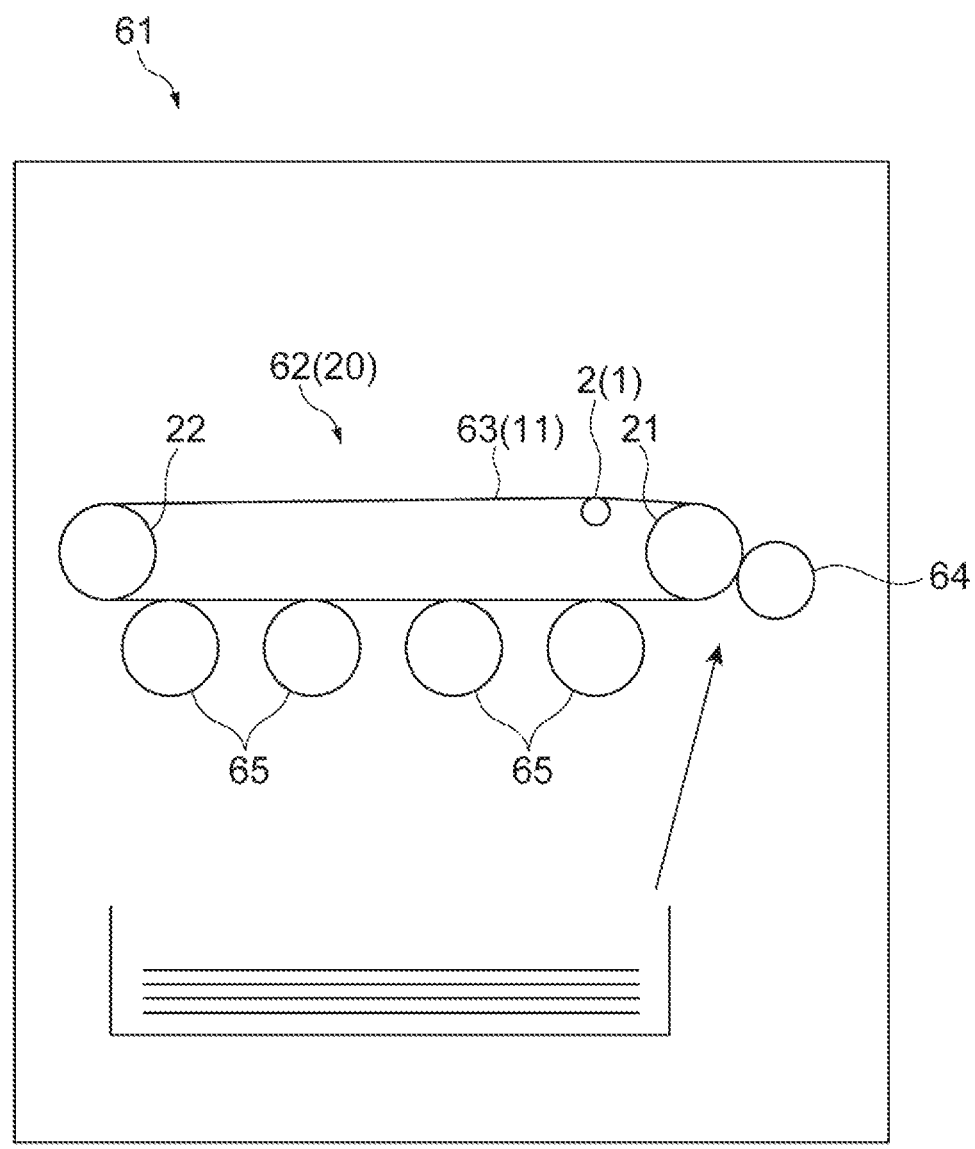
FIG. 15 is a schematic diagram showing components of an example color imaging forming apparatus, including an intermediate transfer unit.

With reference to FIG. 15, an example color image forming apparatus 61, includes the belt driving device 20 as an example intermediate transfer unit (transfer belt system). The intermediate transfer unit 62 includes the first belt roller 21 that is a driving roller, the second belt roller 22 that is a stretching roller, an intermediate transfer belt 63 that is the endless belt 11, and a secondary transfer roller 64. The intermediate transfer unit 62 may include a plurality of idle rollers which are disposed between the first belt roller 21 and the second belt roller 22. The secondary transfer roller 64 is disposed to press a sheet that is a recording medium against the intermediate transfer belt 63 that moves along the first belt roller 21. The color image forming apparatus 61 includes a photoreceptor 65, and various configurations and components of an image forming apparatus. A plurality of the photoreceptors 65 are disposed along a movement direction of the intermediate transfer belt 63.

A toner image formed on each of the photoreceptors 65 is primarily transferred to the intermediate transfer belt 63. The primarily transferred toner image is secondarily transferred to the sheet that is pressed by the secondary transfer roller 64. The toner image that is secondarily transferred to the sheet is fixed by a fixing device (not illustrated). The intermediate transfer unit 62 may include a cleaning blade (not illustrated) that removes a residual toner adhered to the intermediate transfer belt 63. The cleaning blade is pressed to the intermediate transfer belt 63 to remove the residual toner.

In the example color image forming apparatus 61 provided with the example belt driving device 20 is provided, it is possible to suppress a positional deviation in a width direction of the intermediate transfer belt 63. In the intermediate transfer unit 62, occurrence of a deformation such as waving of the intermediate transfer belt 63 may be suppressed. Accordingly, it is possible to prevent a deterioration of close-contact between the cleaning blade and the intermediate transfer belt 63, and thus it is possible to appropriately remove the residual toner. As a result, it is possible to achieve an improved image quality.

It is to be understood that not all aspects, advantages and features described herein may necessarily be achieved by, or included in, any one particular example, Indeed, having described and illustrated various examples herein, it should be apparent that other examples may be modified in arrangement and detail.

For example, the guide of the positioning mechanism may be a groove that is continuous in the X direction.

The invention claimed is:
1. An imaging system comprising:
a steering roller extending along a longitudinal direction, and being tiltable about a fulcrum to adjust an alignment position of an endless belt;
a positioning mechanism coupled to the steering roller, to position an adjustable position of the fulcrum of the steering roller, along the longitudinal direction of the steering roller, wherein the positioning mechanism includes:
a guide extending along the longitudinal direction of the steering roller, and
a protrusion to engage with the guide, the protrusion being located at the adjustable position of the fulcrum,
a pair of belt rollers including a first belt roller and a second belt roller, wherein the endless belt is wound about the pair of belt rollers;
an adjustment member that is movable along a longitudinal direction of the first belt roller, wherein a movement of the adjustment member results from a displacement of the endless belt in the longitudinal direction of the first belt roller; and
a link mechanism coupled between the adjustment member and the steering roller, the steering roller to tilt about the fulcrum in response to the movement of the adjustment member.

2. The imaging system according to claim 1, further comprising:
a pair of bearings to rotatably support the steering roller; and
a bearing supporting member extending in the longitudinal direction of the steering roller, to hold the pair of bearings, the bearing supporting member being tiltable in conjunction with the steering roller,
wherein the guide of the positioning mechanism includes an elongated hole formed in the bearing supporting member.

3. An imaging system comprising:
a steering roller located between a first belt roller and a second belt roller, the steering roller being inclinable around a fulcrum;
a pair of bearings to rotatably support the steering roller about an axis extending in a longitudinal direction of the steering roller;
a bearing supporting member extending in the longitudinal direction of the steering roller, to hold the pair of bearings, and being inclinable together with the steering roller;
a positioning mechanism to adjust an adjustable position of the fulcrum of the steering roller along the longitudinal direction of the steering roller, wherein the positioning mechanism includes:
a slide member extending in a longitudinal direction of the first belt roller, the slide member comprising a columnar member that protrudes toward the bearing supporting member and constitutes the fulcrum of the steering roller, and
a recess portion formed in the bearing supporting member, and extending in the longitudinal direction of the steering roller, the recess portion to accommodate the columnar member; and
a frame to support the first belt roller in the longitudinal direction of the first belt roller, wherein the slide member extends outwardly relative to the frame.

4. The imaging system according to claim 3, further comprising:
a slide guide extending in a longitudinal direction of the slide member, to contact the slide member; and
a slide member positioning mechanism to position the slide member with respect to the slide guide.

5. The imaging system according to claim 4,
wherein the slide member includes a plate portion extending in a longitudinal direction of the slide member, the plate portion including a positioning opening, and
the slide member positioning mechanism includes:
a female screw portion located on the slide guide, and
a positioning screw to pass through the positioning opening of the plate portion, and to engage the female screw portion of the slide guide.

6. The imaging system according to claim 4,
wherein the slide member includes a plate portion extending in the longitudinal direction of the slide member, the plate portion including a positioning opening, and
the slide member positioning mechanism includes,
a positioning hole located on the slide guide, and
a positioning pin to pass through the positioning opening of the plate portion, and to fit into the positioning hole of the slide guide.

7. A transfer belt system comprising:
a steering roller extending along a longitudinal direction, and being tiltable about a fulcrum to adjust an alignment position of a transfer belt that is an endless belt;
a positioning mechanism coupled to the steering roller, to position an adjustable position of the fulcrum of the steering roller, along the longitudinal direction of the steering roller,
wherein the positioning mechanism includes:
a guide extending along the longitudinal direction of the steering roller, and
a protrusion to engage with the guide, the protrusion being located at the adjustable position of the fulcrum;
a pair of belt rollers including a first belt roller and a second belt roller, wherein the endless belt is wound about the pair of belt rollers;
an adjustment member that is movable along a longitudinal direction of the first belt roller, wherein a movement of the adjustment member results from a displacement of the endless belt in the longitudinal direction of the first belt roller; and
a link mechanism coupled between the adjustment member and the steering roller, the steering roller to tilt about the fulcrum in response to the movement of the adjustment member.

8. The transfer belt system according to claim 7 comprising:
a pair of bearings to rotatably support the steering roller about an axis extending in the longitudinal direction of the steering roller; and
a bearing supporting member extending in the longitudinal direction of the steering roller, holding the pair of bearings, and being inclinable together with the steering roller;
wherein the steering roller is located between a first belt roller and a second belt roller,
wherein the positioning mechanism includes:
a slide member extending in a longitudinal direction of the first belt roller, the slide member supporting the protrusion which includes a columnar member that protrudes toward the steering roller, and
wherein the guide of the positioning mechanism comprises a recess portion formed in the bearing supporting member, and extending in the longitudinal direction of the steering roller, the recess portion to accommodate the columnar member.

9. The transfer belt system according to claim 8, further comprising a frame to support the first belt roller in the longitudinal direction of the first belt roller, wherein the slide member extends outwardly relative to the frame.

10. The transfer belt system according to claim 8, further comprising:
a slide guide extending in a longitudinal direction of the slide member, to contact the slide member; and
a slide member positioning mechanism to position the slide member with respect to the slide guide.

11. The transfer belt system according to claim 10,
wherein the slide member includes a plate portion extending in a longitudinal direction of the slide member,
the plate portion including a positioning opening passing through a thickness of the plate portion,
the slide guide includes a guide surface to contact a bottom surface of the plate portion, and
the slide member positioning mechanism includes:
a female screw portion located on the slide guide, and
a positioning screw to pass through the positioning opening of the plate portion, and to engage the female screw portion of the slide guide.

12. The transfer belt system according to claim 10,
wherein the slide member includes a plate portion extending in the longitudinal direction of the slide member, the plate portion including a positioning opening passing through a thickness of the plate portion,
the slide guide includes a guide surface to contact a bottom surface of the plate portion, and
the slide member positioning mechanism includes:
   a positioning hole located on the slide guide, and
   a positioning pin to pass through the positioning opening of the plate portion, and to fit into the positioning hole of the slide guide.

* * * * *